(No Model.) 6 Sheets—Sheet 1.

W. S. IVINS.
MACHINE FOR MAKING HINGES.

No. 548,710. Patented Oct. 29, 1895.

WITNESSES:
Edward R. Zoll
Jno. A. Carlisle

INVENTOR
Walter S Ivins
BY
Augustus B Stoughton
ATTORNEY (No Model.) 6 Sheets—Sheet 2.

W. S. IVINS.
MACHINE FOR MAKING HINGES.

No. 548,710. Patented Oct. 29, 1895.

WITNESSES:
Edward R. Zoll

INVENTOR
Walter S. Ivins
BY
Augustus B. Stoughton
ATTORNEY

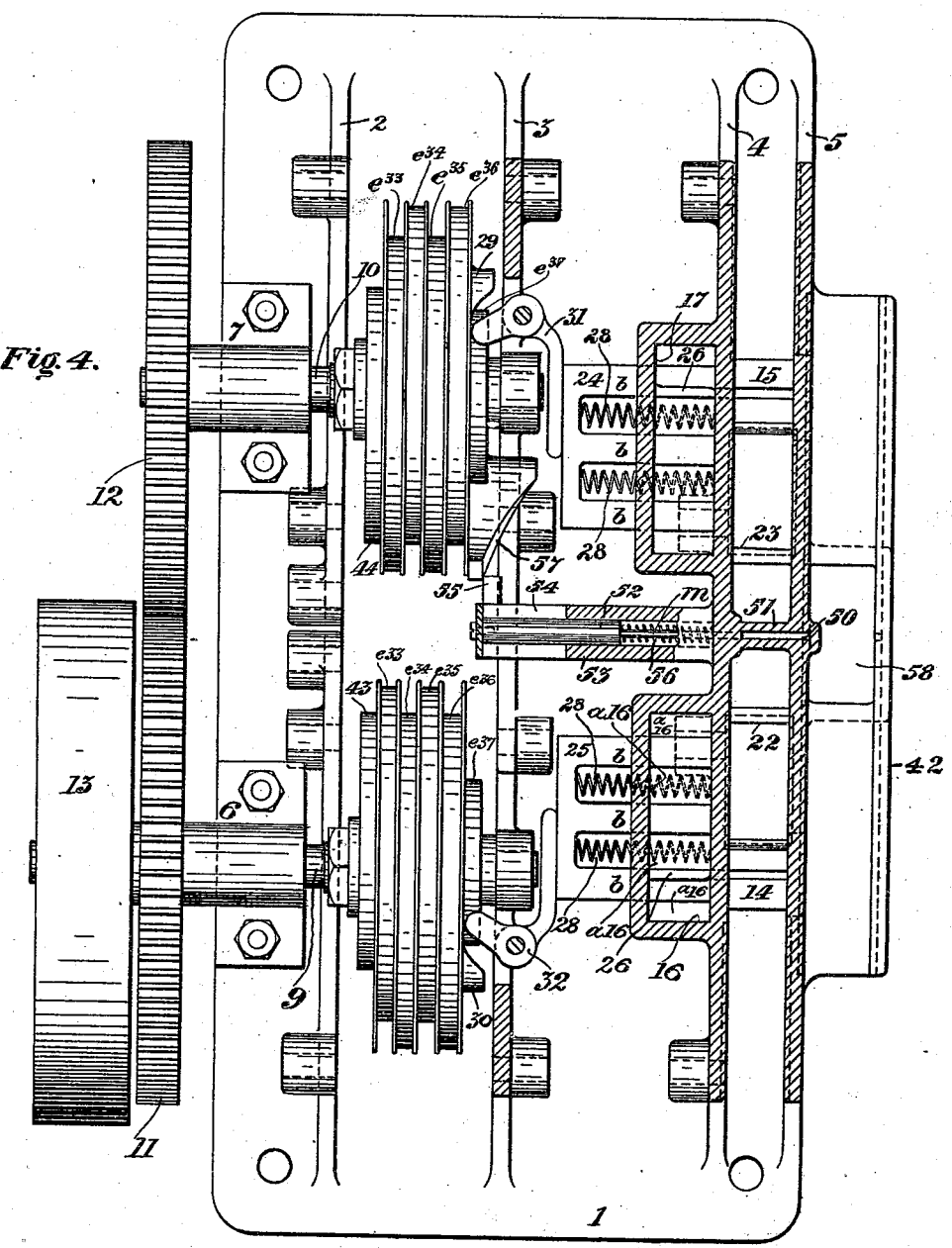

(No Model.)  W. S. IVINS.  6 Sheets—Sheet 4.
MACHINE FOR MAKING HINGES.
No. 548,710.  Patented Oct. 29, 1895.
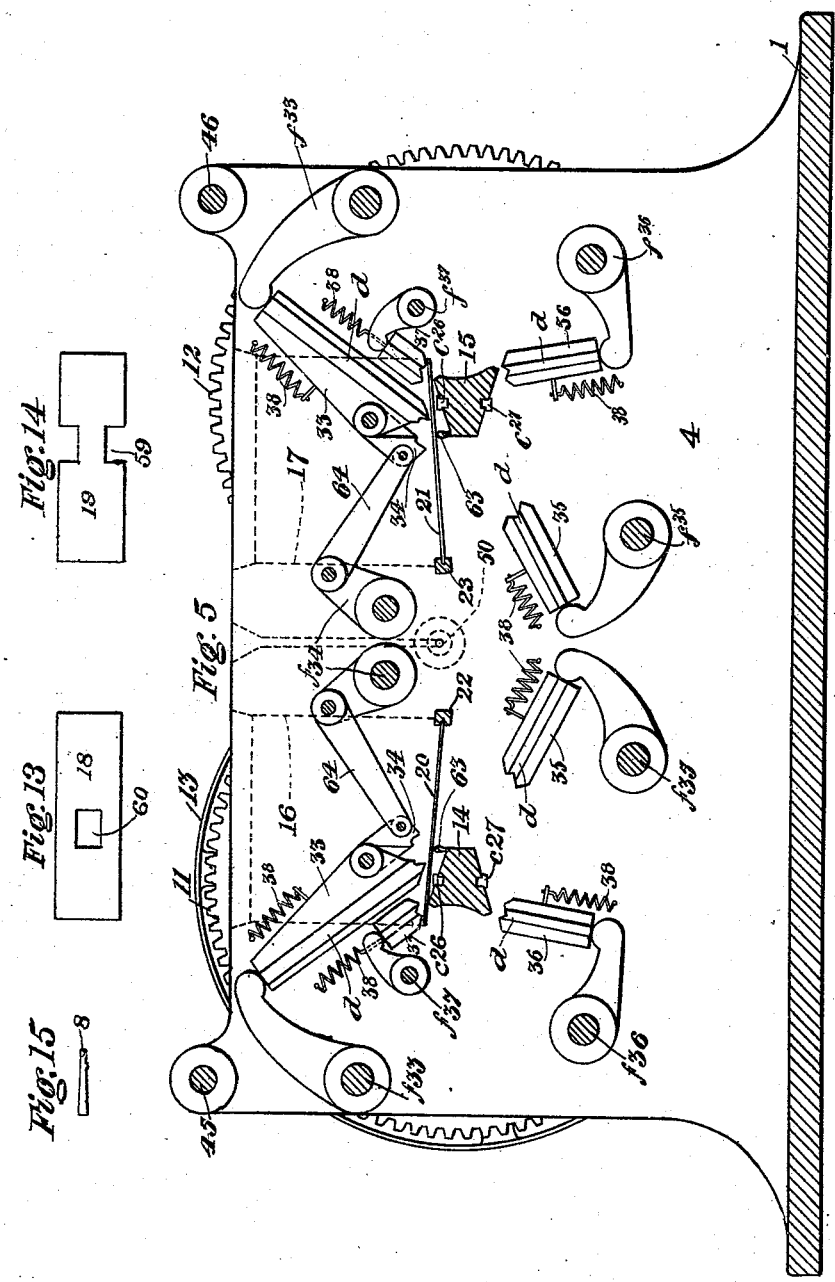
WITNESSES:
Edward R. Zoll
Jno. A. Carlisle
INVENTOR
Walter S. Ivins
BY
Augustus B. Stoughton
ATTORNEY

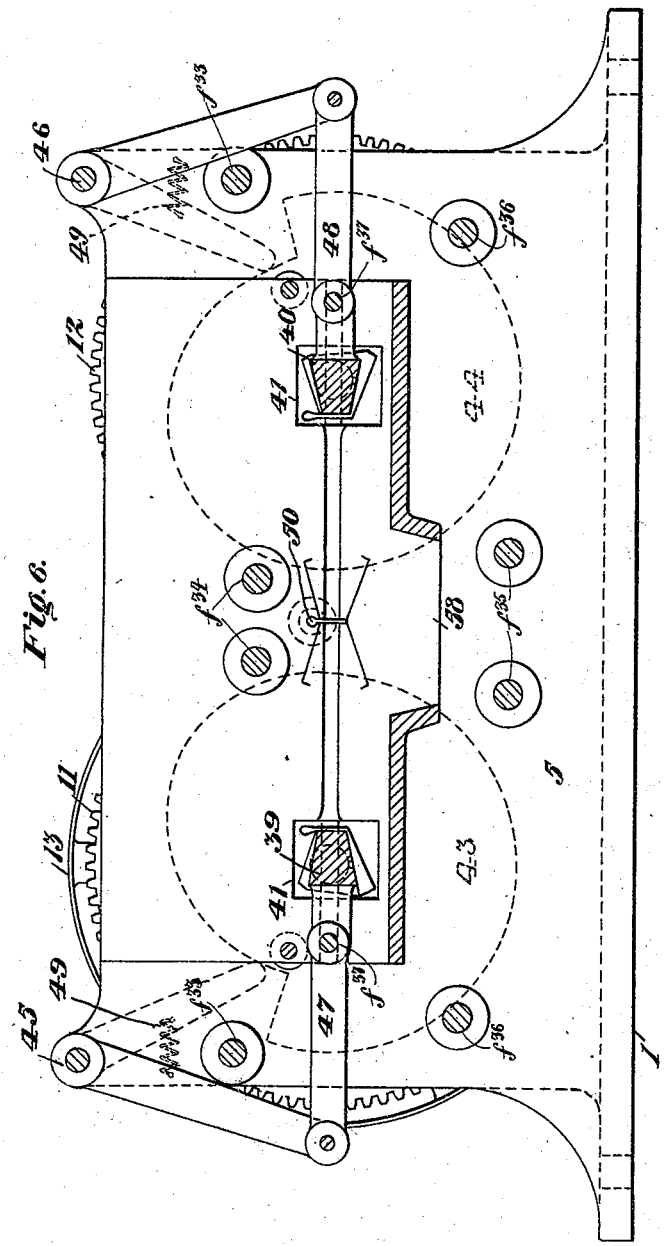

(No Model.) 6 Sheets—Sheet 6.
W. S. IVINS.
MACHINE FOR MAKING HINGES.
No. 548,710. Patented Oct. 29, 1895.
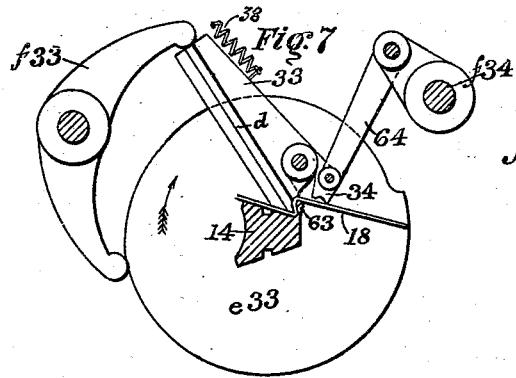
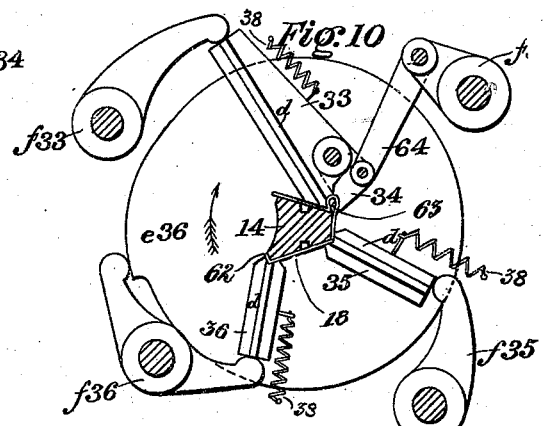
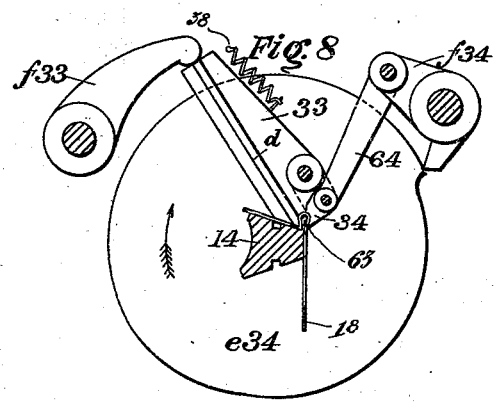
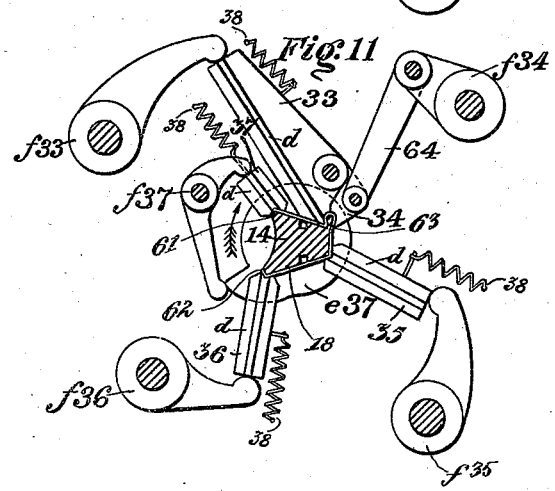
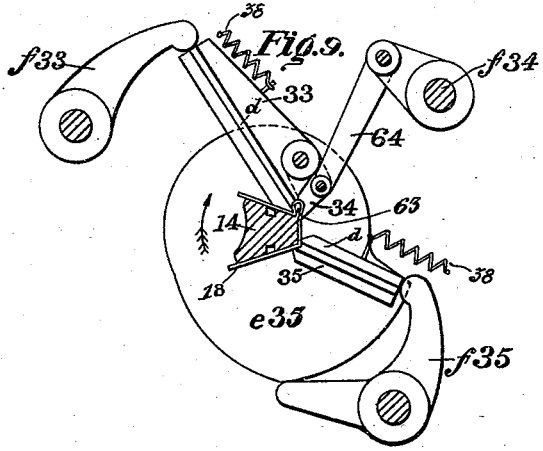
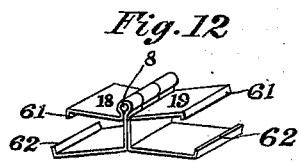
WITNESSES:
Edward R. Zoll.
Jno. A. Carlisle
INVENTOR
Walter S. Ivins
BY
Augustus B. Stoughton.
ATTORNEY

UNITED STATES PATENT OFFICE.

WALTER S. IVINS, OF PHILADELPHIA, PENNSYLVANIA.

MACHINE FOR MAKING HINGES.

SPECIFICATION forming part of Letters Patent No. 548,710, dated October 29, 1895.

Application filed July 1, 1895. Serial No. 554,587. (No model.)

*To all whom it may concern:*

Be it known that I, WALTER S. IVINS, a citizen of the United States, residing at the city of Philadelphia, in the county of Philadelphia and State of Pennsylvania, have invented certain new and useful Improvements in Machines for Making Hinges, of which the following is a specification.

The principal object of my present invention is to provide a simple, compact, automatic, and comparatively inexpensive machine for making hinges; and to this end my invention consists in the improvements hereinafter claimed.

The nature, characteristic features, and scope of my invention will be more fully understood from the following description, taken in connection with the accompanying drawings, forming part hereof, and in which—

Figure 1:
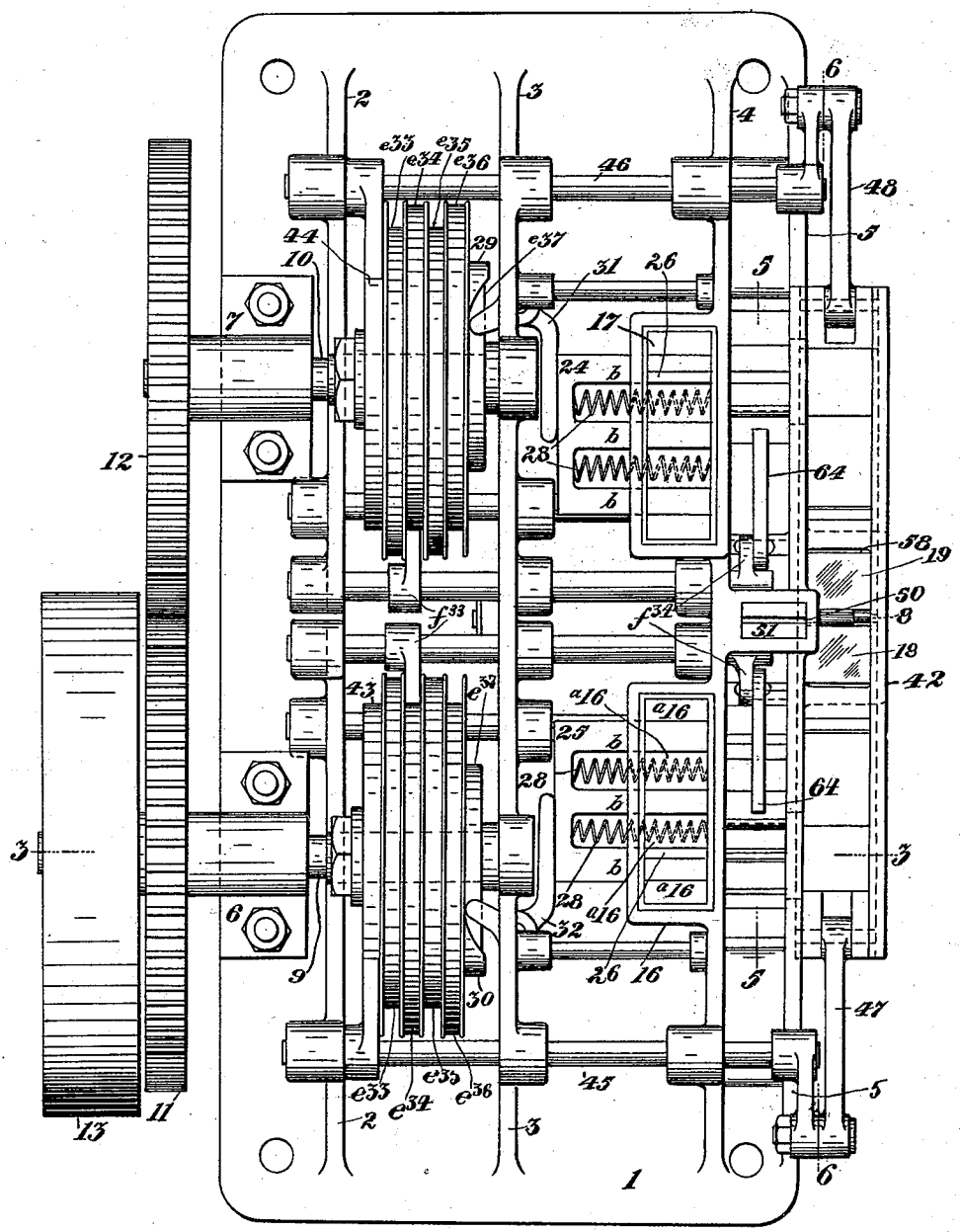
Figure 2:
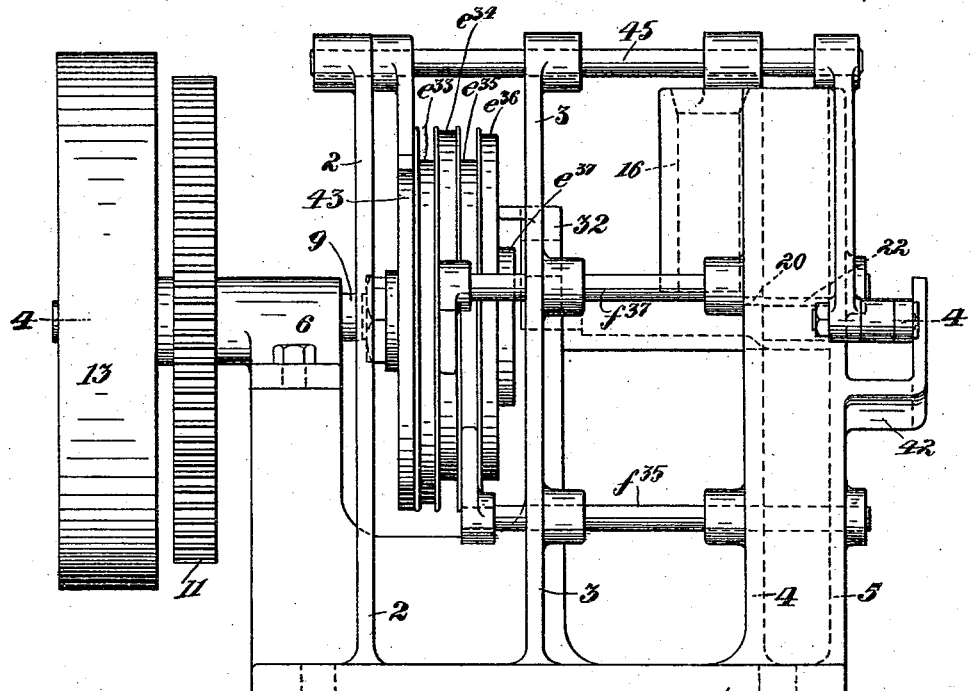
Figure 3:
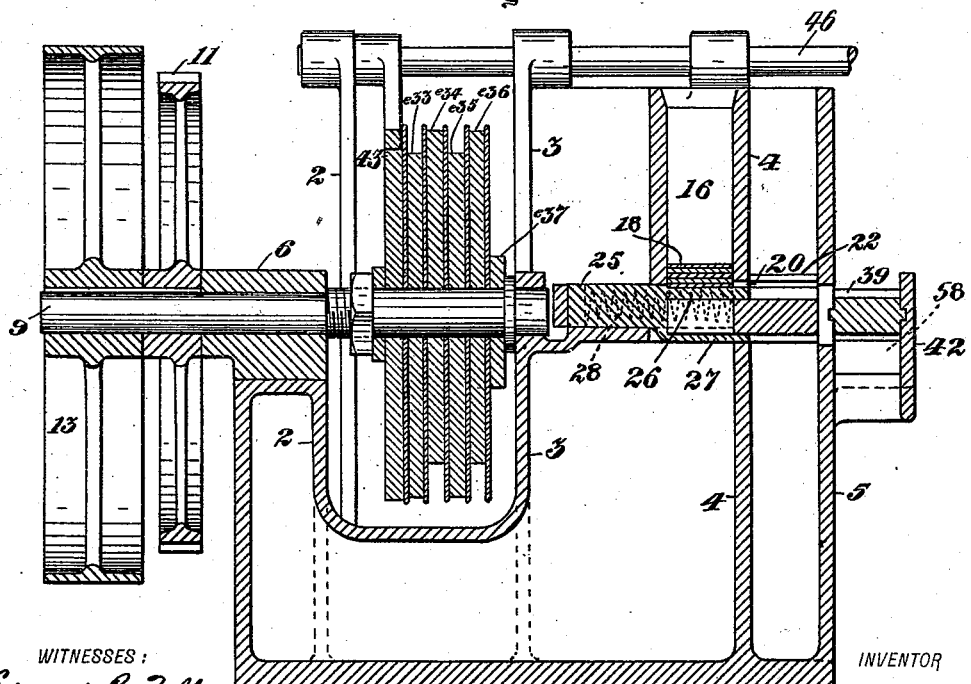

Figure 1 is a top or plan view of the machine embodying features of my invention. Fig. 2 is a side elevational view of the same. Fig. 3 is a transverse sectional view taken on the line 3 3 of Fig. 1. Fig. 4 is a horizontal sectional view taken on the line 4 4 of Fig. 2 through the front part of the machine. Fig. 5 is a longitudinal sectional view taken on the line 5 5 of Fig. 1. Fig. 6 is a similar view taken on the line 6 6 of Fig. 1. Figs. 7 to 11 are diagrammatic views illustrating parts of the machine and also the various steps in the formation of a hinge. Fig. 12 is a perspective view of a hinge fabricated by means of the machine illustrated in the preceding figures. Figs. 13 and 14 are top or plan views of the blanks from which the hinge is formed; and Fig. 15 is a view of a tapering pintle, by means of which the parts of the hinge are connected.

In the drawings I have illustrated the framework of the machine as composed of a base 1, provided with four upright transversely-ranging walls 2 3 4 5, and with pillow-blocks or bearings 6 and 7, although it must be understood that the shape of the framework may be varied or changed as required.

The machine illustrated in the drawings not only applies a pintle, as 8, to the respective parts of the hinge, but also simultaneously bends each of the latter into the proper shape. For this purpose use is made of two cam-shafts 9 and 10, revolubly supported in the pillow-blocks 6 and 7 and in one of the walls—for example, the wall 3—of the framework and geared together by means of intermeshing gear-wheels 11 and 12. Power for driving these shafts is applied to the machine, for example, by means of a pulley, wheel, or gear 13.

14 and 15 are matrices or shaping-blocks fixed between the walls 4 and 5 or otherwise immovably supported, whose contour corresponds with the shape of the finished hinges.

16 and 17 are hoppers adapted for the reception the one of blanks 18, Fig. 13, and the other of blanks 19, Fig. 14. These hoppers may be applied to the left-hand face of the wall 4, or otherwise suitably supported, and there are openings 20 and 21, which, in the present instance, are slightly inclined upward toward the outside of the machine, as shown in Fig. 5, and which permit blanks to be transferred from the hoppers in such manner that they rest upon the matrices or shaping-blocks 14 and 15, and at one end in grooved or other suitable guides 22 and 23, that range transversely of the walls 4 and 5. The blanks 18 and 19 are quite thin, and therefore if supported at the bottom of the hoppers at or near their ends would sag, and thereby interfere with their being fed singly through the slots or openings 20 and 21. To obviate this difficulty, I preferably close the bottom of each of the hoppers by means of slats $a^{16}$, which have openings between them and which support the pile of blanks and prevent them from bending or sagging at their center portions.

24 and 25 are pushers provided with fingers $b$, that work in the spaces between the slats $a^{16}$ and extend above the same a distance corrosponding with the thickness of a blank. These pushers 24 and 25 are also provided with one or more, in the present instance two, rods 26 and 27, that penetrate suitable openings in the walls 4 and 5 and work in grooves $c^{26}$ and $c^{27}$ in the matrices or shaping-blocks 14 and 15. When the pushers 24 and 25 are moved toward the right, their fingers $b$ collide with the inner edge of the bottom blank of the pile of blanks in each of the hoppers and their rods 26 and 27 collide with the edge of the blank which has been shaped on the matrices or shaping blocks 14 and 15 in a manner to be hereinafter described. The continued motion of these pushers toward the right causes the bent blanks to be removed or pushed off the ends of the matrices or shaping-blocks and causes unbent blanks to be pushed through the openings 20 and 21 into position on top of the matrices or shaping-blocks and into the guides or supports 22 and 23.

As shown in the drawings, the pusher-blocks are normally shifted toward the left by means of springs 28, although weights and their complemental cords could readily be substituted therefor. These pushers are moved toward the right by means of cams 29 and 30, keyed or otherwise fast upon the shafts 9 and 10, and which in the presence instance are of the crown type and operate through the intervention of bell-crank levers 31 and 32. The blanks are bent around onto the matrices or shaping-blocks 14 and 15 by means of dies 33 and 34, hinged together for purposes to be hereinafter described, and by means of dies 35, 36, and 37. These dies are guided in suitable ways applied to or formed on the adjacent surfaces of the walls 4 and 5.

As shown in the drawings, the opposite sides of the shanks of the dies are provided with ribs or feathers $d$, adapted to corresponding grooves in the faces of the respective walls 4 and 5. These dies are normally drawn away from their corresponding matrices or shaping-blocks by means of springs 38 or their equivalents, as weights and their complemental cords, and are driven toward the same through the intervention of cams $e^{33}$ $e^{34}$ $e^{35}$ $e^{36}$ $e^{37}$, acting by means of rock-shafts $f^{33}$ $f^{34}$ $f^{35}$ $f^{36}$ $f^{37}$, suitably journaled in the walls 2, 3, and 4 and provided, respectively, with arms, whereof one is acted upon by one of said cams and whereof the other operates the corresponding die.

39 and 40 are carriers somewhat smaller than the matrices or shaping-blocks 14 and 15 and adapted to receive the hinges when they are pushed off the latter through openings 41 in the wall 5 by the rods 26 and 27, as has been above explained. These carriers are afforded a range of motion in suitable guides or ways formed on or applied to the right-hand face of the wall 5 and the left-hand face of a bracket 42, carried thereby or by some other suitable part of the machine—for example, the base 1. These carriers 39 and 40 are reciprocated by cams 43 and 44, acting through the intervention of rock-shafts 45, and 46, having arms in range of the faces of the cams 43 and 44, and arms connected with the carriers through the intervention of links 47 and 48.

49 are springs for insuring proper engagement of the cams 43 and 44 with the arms upon which they operate.

When the carriers 39 and 40 have received the respective bent members of a hinge, their cams cause them to be shifted toward each other and toward the center of the machine in such manner that their knuckles are in alignment with each other and with a hole 50 in the wall 5, through which pintles are passed into the knuckles.

51 is a hopper located upon the rear face of the wall 5 and having its bottom in alignment with the hole 50 therein.

52 is a pintle-feeder adapted to penetrate an opening in the left-hand wall of the pintle-hopper 51 and to work in ways 53, provided with a slot 54 for the accommodation of a projection 55 on the pintle-feeder 52, whereby it is held against accidental rotation. This pintle-feeder 52 is normally pushed toward the left by a spring 56 and is driven toward the right by a cam 57, that is carried by one of the cam-shafts and operates upon the projection 55. It may be stated that the shape of the cam 57 is such that it causes the pintle-feeder 52 to bear upon the pintle after its insertion in the knuckles of the respective blanks until after the carriers 39 and 40 have been drawn apart, thus insuring the detachment of the hinge from them. Subsequently the pintle-feeder releases the hinge and it falls from the machine through the opening or spout 58.

The mode of operation of my improved machine may be described as follows: Blanks are first stamped or otherwise shaped as shown in Figs. 13 and 14. One of these blanks 19 is provided at or near its center portion with a web 59 and the other of these blanks 18 is provided at or near its center portion with an opening 60. The object of this construction is to provide in the shaped blanks interlocking-knuckles, through which the pintle 8 passes, as will be readily understood by reference to Fig. 12. In such figure it will be seen that the hinge is also provided with projections 61 and 62, that are driven into the members, parts, things, or sections which are to be connected by the hinge, and thus serve as a means for attaching it thereto. Blanks 18 are supplied to the hopper 16, and blanks 19 are supplied to the hopper 17, and pintles 8 are supplied to the pintle-hopper 51 in such manner that their smallest ends point toward the right. As the cam-shafts are rotated, a blank is fed from each of the hoppers through the openings 20 and 21 in the wall 4 into position above the matrices or shaping-blocks 14 and 15 and with its end upon the guides 22 and 23. For the sake of clearness the bending of the blank at the left-hand side of the machine will be described, and it must be borne in mind that the blank at the right-hand side of the machine is bent in a similar manner. Referring to Fig. 7, the rotation of the cam $e^{33}$ causes the die 33 to strike the blank in an inclined direction, and thus drive and hold it against the left-hand side of the horn 63 of the matrix or shaping-block, so as to form one-half of the knuckle of the hinge. While the blank is clamped in this position, the cam $e^{34}$ swings the die 34 about its point of pivotal connection with the die 33 and, through the intervention of a link 64, in such manner that it bends and clamps the blank around and at the right-hand side of the horn 63, thus forming the knuckle and holding it in position and causing the blank to lie against the right-hand face of the matrix or shaping-block, as shown in Fig. 8. Subsequently the cam $e^{35}$ operates to drive the die 35 toward the lower right-hand corner of the block or matrix and thus bends the hinge around the same, as shown in Fig. 9, and clamps it in such position, whereupon the die 36 is driven by its cam $e^{36}$ and its accessories toward the left-hand corner of the matrix or block, with the result that the projection 62 is bent upon the blank and clamped on the matrix or shaping-block. The die 37, moving under the influence of its cam $e^{37}$ and other accessories, drives the blank onto the upper left-hand corner of the block or matrix, and thus forms the projection 61. All the dies under the control of their cams and springs then move outward from the block or matrix and unclamp the bent member of the hinge. A second operation of the pushers 24 and 25 not only feeds additional blanks to the matrices or shaping-blocks, but also, acting through the intervention of the rods 26 and 27, pushes the previously-bent blanks from the matrices or shaping-blocks through the openings 41 in the wall 5, onto the carriers 39 and 40, whose movements are so timed as that they shall be in position to receive them. The cams 43 and 44, acting through the intervention of their accessories, operate to shift the carriers having the bent members upon them toward each other and toward the center of the machine until the knuckles of the respective members are in alignment with each other and with the opening 50 in the wall 5, whereupon the pintle-feeder 52, moving under the influence of its cam 57, pushes a pintle 8 first through the hole 50, and then into the openings in the knuckles of the hinge. While the pintle-feeder still bears upon the pintle, the carriers 39 and 40 move away from the center of the machine. Afterward the pintle-feeder moves toward the left and the completed hinge falls through the opening or spout 58.

It will be obvious to those skilled in the art to which my invention relates that modifications may be made in details without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

A machine for making hinges comprising the combination of, matrices or shaping blocks and their complemental dies, carriers reciprocated into alignment with said matrices or shaping blocks and into proximity with each other to bring the knuckles of hinge members into alignment, means for transferring hinge members from the blocks or matrices to the carriers, devices for inserting pintles, and mechanism for operating said parts, substantially as described.

In testimony whereof I have hereunto signed my name in the presence of two witnesses.

WALTER S. IVINS.

Witnesses:
WM. J. JACKSON,
A. B. STOUGHTON.